C. M. HECK.
AUTOMATIC PHONOGRAPH.
APPLICATION FILED MAY 20, 1915.

1,347,096.

Patented July 20, 1920.
7 SHEETS—SHEET 2.

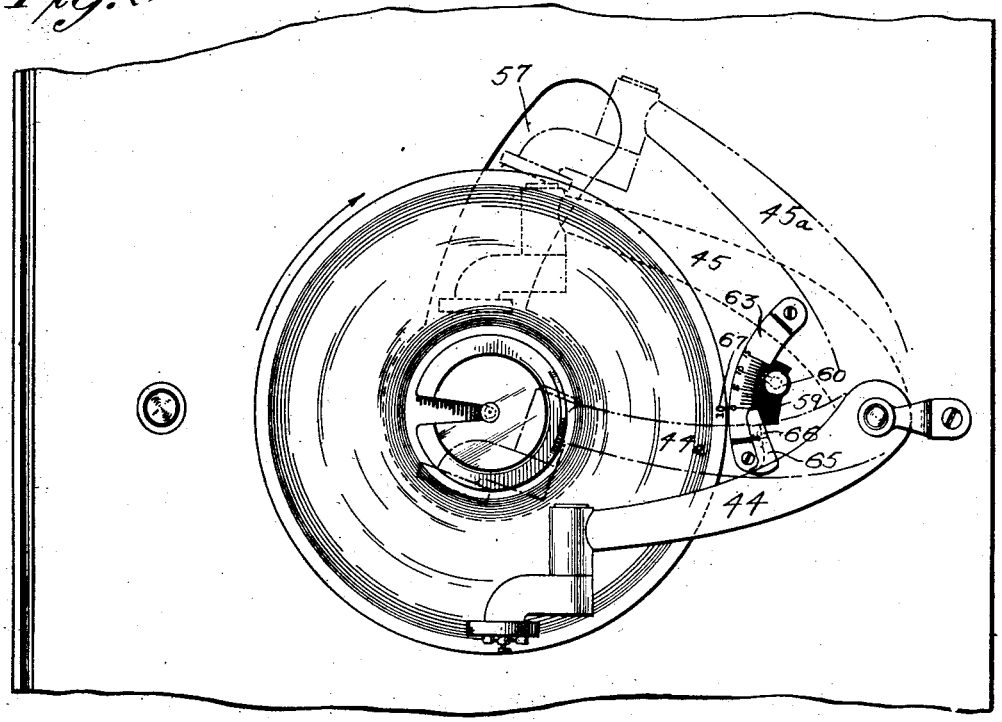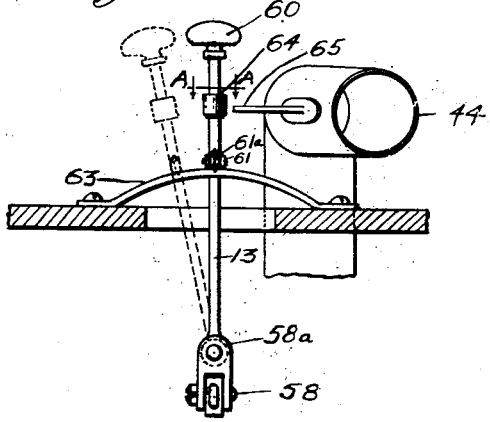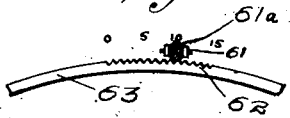

C. M. HECK.
AUTOMATIC PHONOGRAPH.
APPLICATION FILED MAY 20, 1915.
1,347,096.
Patented July 20, 1920.
7 SHEETS—SHEET 4.
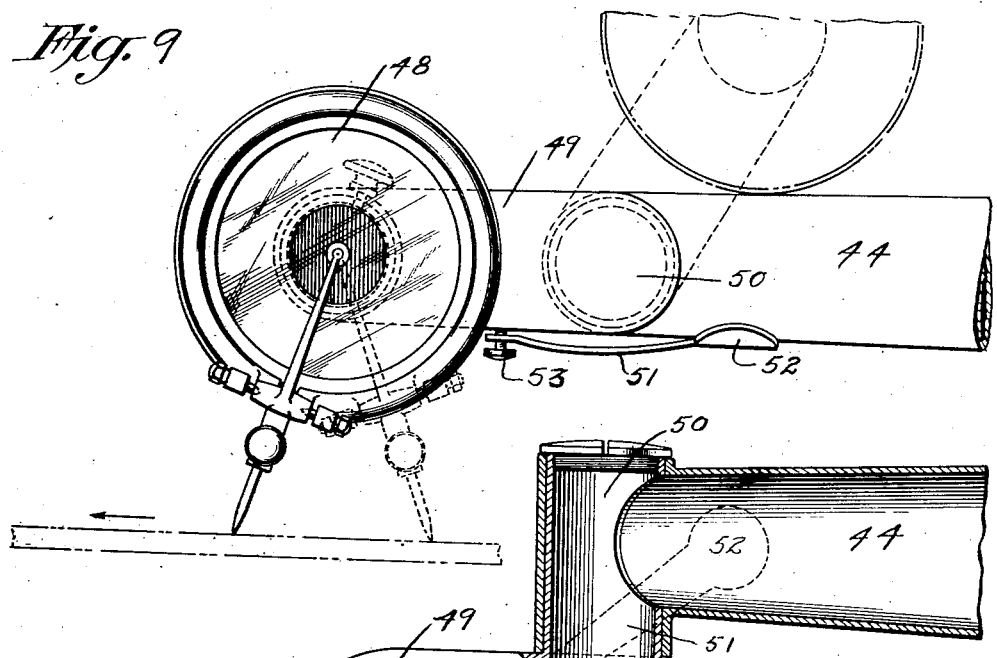
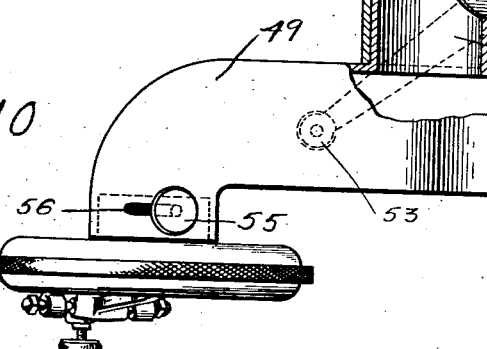
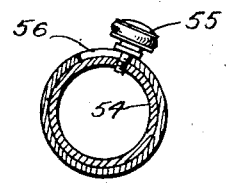
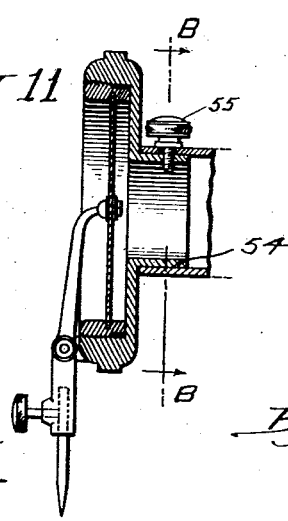
Witnesses:
P. J. Gathmann
E. A. Hester
Inventor:
Charles M. Heck.
By his Attorneys:

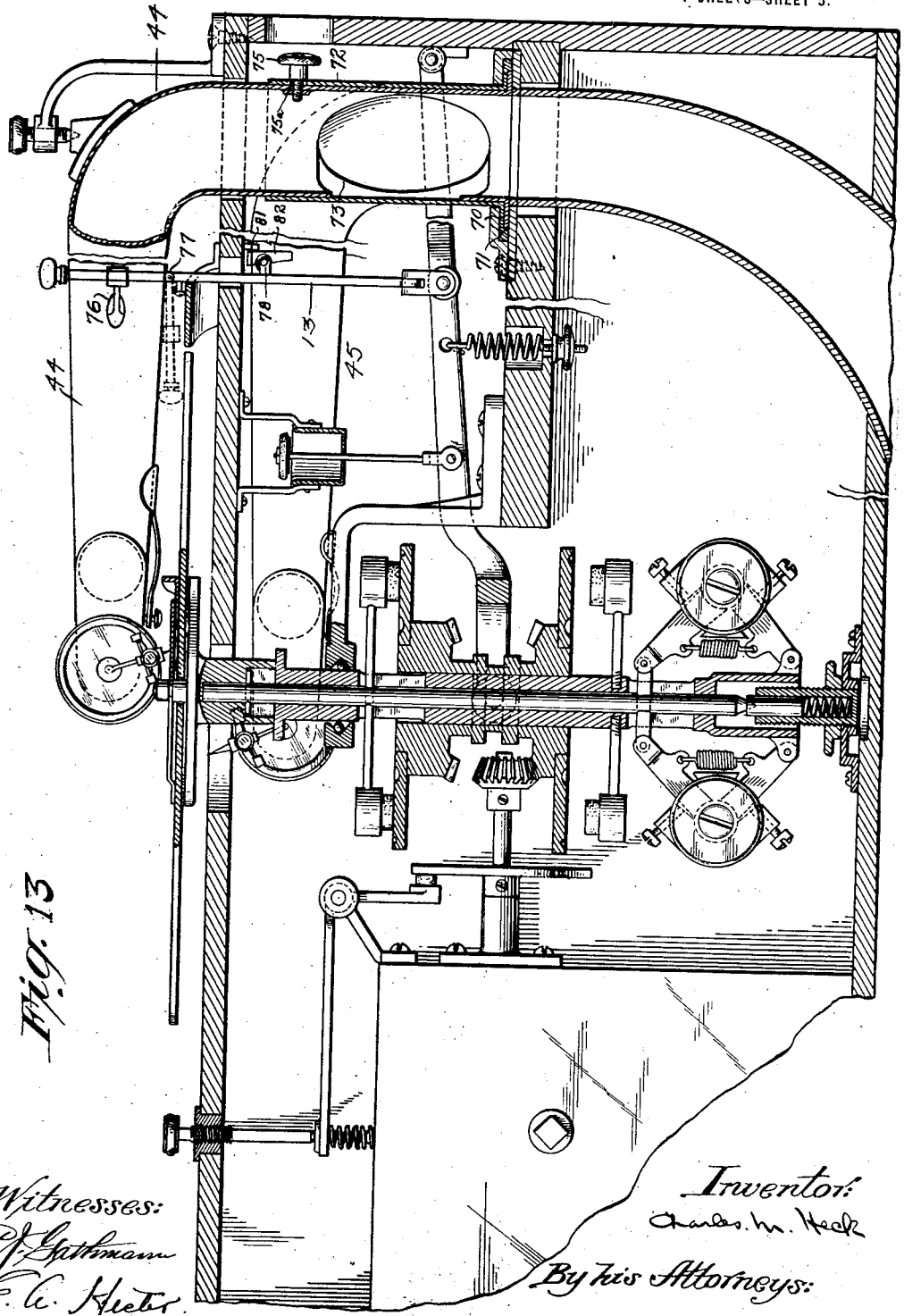

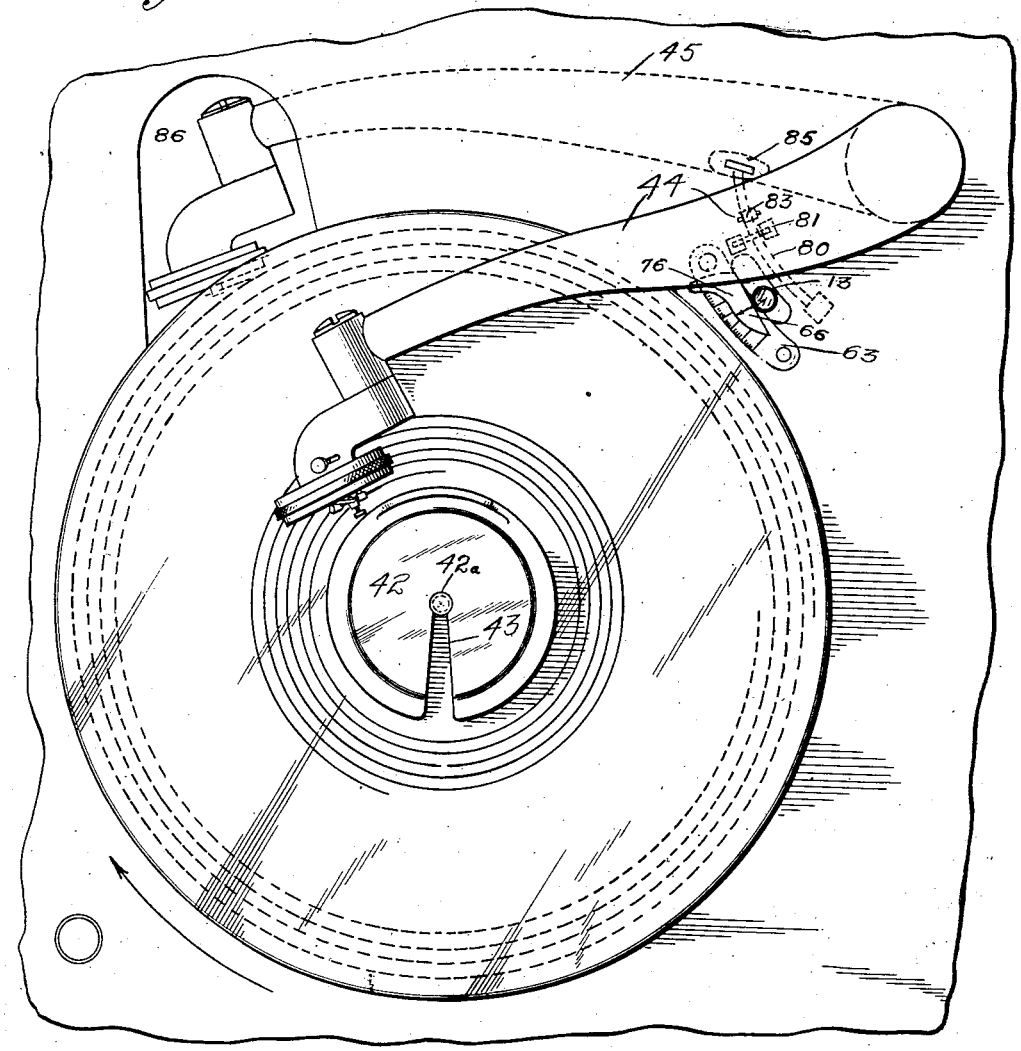
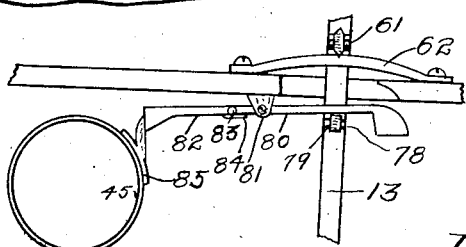

C. M. HECK.
AUTOMATIC PHONOGRAPH.
APPLICATION FILED MAY 20, 1915.

1,347,096.

Patented July 20, 1920.
7 SHEETS—SHEET 7.

Witnesses
E. A. Hester
L. C. Henry

Inventor:
Charles M. Heck
By his Attorneys:

UNITED STATES PATENT OFFICE.

CHARLES M. HECK, OF RALEIGH, NORTH CAROLINA.

AUTOMATIC PHONOGRAPH.

1,347,096.  Specification of Letters Patent.  Patented July 20, 1920.

Application filed May 20, 1915. Serial No. 29,422.

*To all whom it may concern:*

Be it known that I, CHARLES M. HECK, a citizen of the United States, residing at Raleigh, in the county of Wake and State of North Carolina, have invented a new and useful Automatic Phonograph, of which the following is a specification.

My invention relates to phonographs and seeks to provide a method and apparatus for automatically bringing a sound record into operative relation with a stylus, and for bringing each of two surfaces of a sound record successively in contact with two styli.

It further seeks to provide a method and apparatus whereby contact between a record and stylus will take place automatically only when the record has attained the desired speed for reproduction and contact will automatically be maintained only while the said speed is maintained.

It further seeks to provide a method and apparatus whereby in placing a record and adjusting the mechanism thereto energy will be stored up that later, at a desired point in the operation, will be automatically released and act (through supplied means) to perform desired changes to continue the operation of the mechanism.

A further object of the invention is to provide a phonograph that will play in succession both of the sides of a disk record of the type in general use.

With these and other objects in view the invention consists in the method of operation and features of construction and combinations of parts hereinafter set forth, illustrated in the accompanying drawings and more particularly pointed out in the appended claims.

Figure 1:
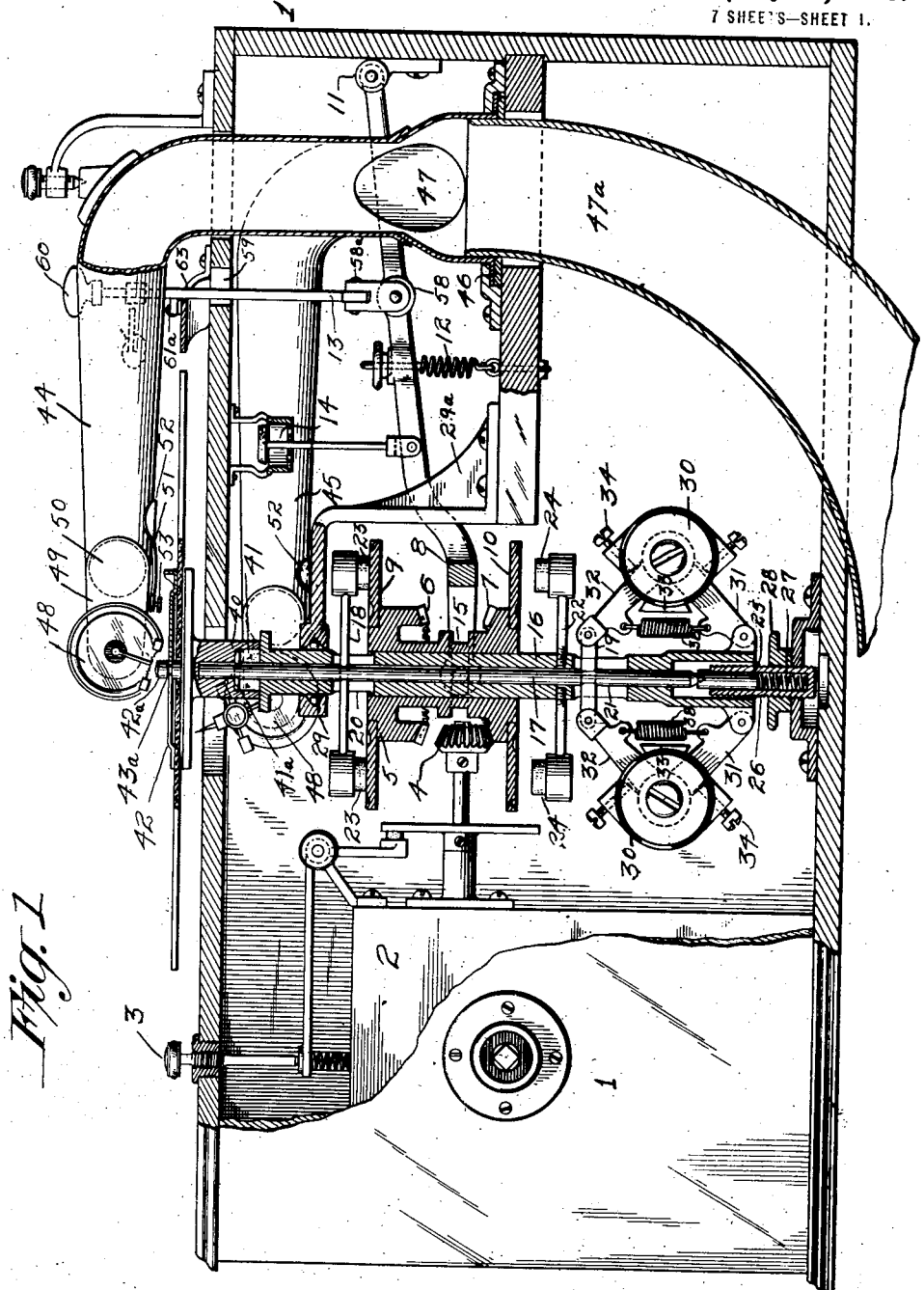
Figure 2:
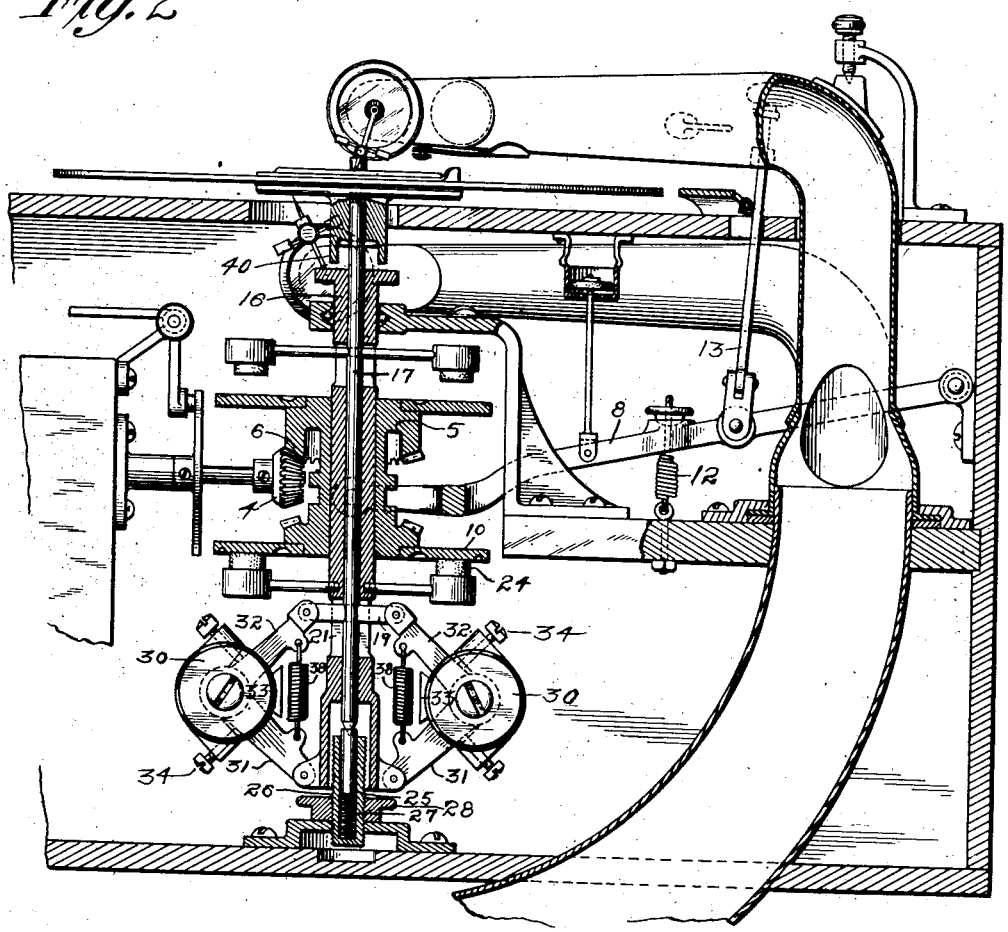
Figure 3:
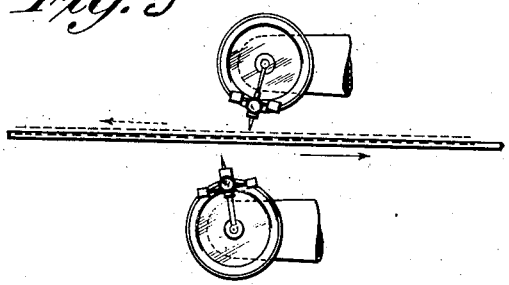
Figure 4:
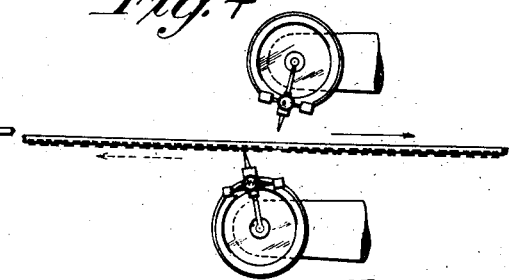
Figure 15:
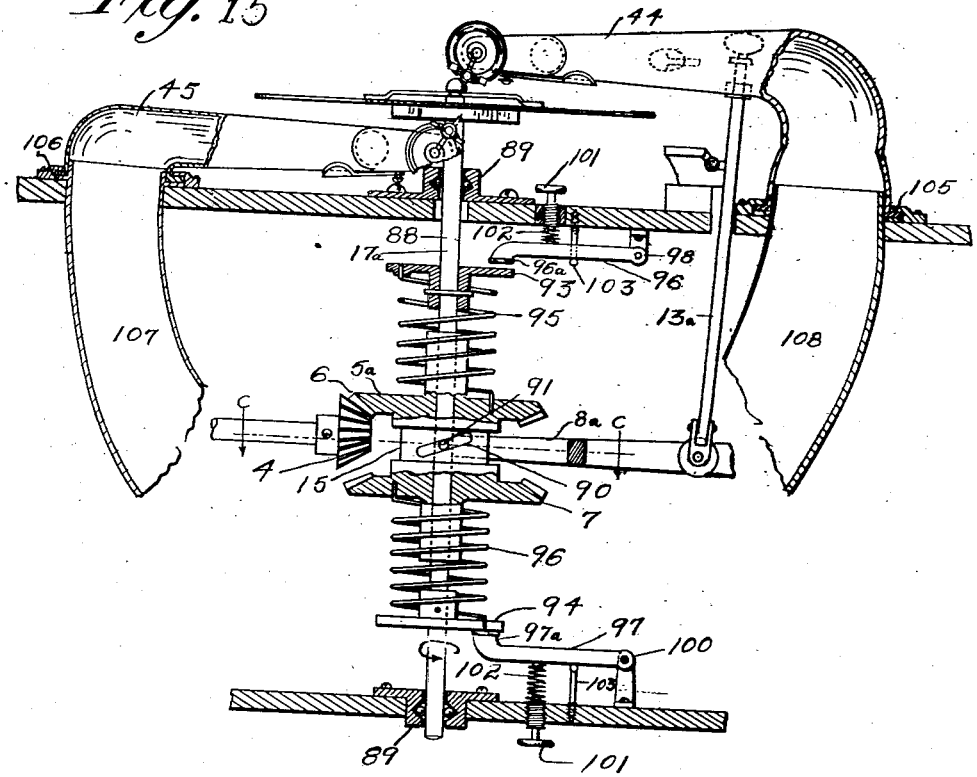
Figure 16:
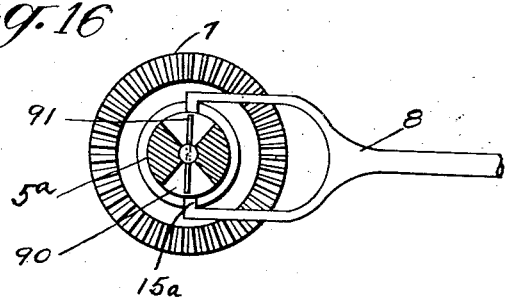

In the drawings Figure 1 is an elevation partly in section of a machine embodying the principles of the invention. Fig. 2 is the machine illustrated in Fig. 1, the parts being in the second position of its operation. Fig. 3 is a detail of Fig. 1 showing the relative position of the styli and record disk. Fig. 4 is a like detail for the position illustrated in Fig. 2. Fig. 5 is a plan view showing the relation of the tone arms in the positions illustrated in Fig. 1 and Fig. 2. Fig. 6 is a detail of the trip mechanism of Fig. 1. Fig. 7 is a section of Fig. 6 taken along line A—A; Fig. 8 is a detail of the setting plate of Fig. 1. Fig. 9 is a detail elevation of the sound box and its connections to the tone arm. Fig. 10 is a plan view of Fig. 9. Fig. 11 is a sectional view through a sound box perpendicular to the tone arm. Fig. 12 is a section through Fig. 11 on line B—B—. Fig. 13 is an elevation partly in section of a slight modification of Fig. 1. Fig. 14 is a plan view of the disk and tone arms of Fig. 13. Fig. 14ª is a detail of the locking device of the lower tone arm of Fig. 14. Fig. 15 is an elevation partly in section of a modification of the invention. Fig. 16 is a section along line C—C of Fig. 15.

Similar numerals of reference indicate corresponding parts in the figures.

In the operation of a phonograph it is found of great importance to have contact between the record and stylus take place only after the proper speed of the record has been attained. While a method of producing this contact automatically has been devised using inertia effects, so far as I know, no one has devised a method employing the principle of centrifugal force. The operation by means of inertia cannot be related to speed as inertia is wholly independent of speed. It is only the rate of getting up speed that the action relies on and the rate of getting up speed is not a constant element in a phonograph. Therefore, the inertia effect cannot be as dependable as an effect related to the speed itself which speed is of necessity so carefully controlled in all phonographs. Consequently the application of centrifugal force for various operations other than speed regulation, introduces an important element in phonograph constructions.

Means have been devised whereby styli are made to move selectively to contact with a record, but any operation on the basis of moving the record through the action of centrifugal force to contact with styli, I think, is new. In certain operations the movement to produce contact between two elements is the same in principle whichever of the elements is moved, to meet the stationary element. If, however, each of the two elements is also performing a motion other than the motion to produce contact, as is found in a phonograph, the principle is different. Further, if the contact is to take place at a specific point or time which is related to a motion not common to both elements, wholly different principles and constructions must be resorted to. More than this, we have in a phonograph two systems entirely dissimilar in relative construction and function; one element is light, delicate and almost frictionless, and adapted with the greatest care to be relieved of strains; the other element is a strong, rapidly moving system, subject to large frictional relations, and capable of withstanding strains, and being in rapid motion is not only possessed of considerable stored up energy itself but is continuously in contact with the original source of energy that operates the phonograph.

The apparatus herein described, using the above methods of operation, is an automatic phonograph which when set will play in succession both sides of a record disk of the type in general use. The word similar has been used to define a record in which the direction of recording with respect to the rotation is the same on both sides of the disk. I have followed this terminology and defined as dissimilar those records which are recorded in two directions of rotation. Machines have been devised for playing both sides of similar disks simultaneously or in succession, but records have to be made peculiarly for these machines. There is, therefore, a large demand for a machine that can play both sides of dissimilar disks just as they are made for the standard machines of to-day. The machine I have invented will play both sides of such disks in succession, automatically and other forms of disks.

In Fig. 1, 1 represents a suitable casing or support for a phonograph mechanism; 2 represents a motor with a suitable starter, 3; the motor operates through a beveled gear 4 to rotate sleeve 5. Two spaced apart beveled gears 6 and 7 are formed on the sleeve 5, said sleeve having circular friction plates 9 and 10 fixed to either end. Operating lever 8 is pivoted to the casing at 11 and raised against the tension of an adjustable spring 12 by pivoted lever 13. A dash pot 14 of suitable construction protects the mechanism from too sudden reversal. Pins 15ª, shown in Fig. 16, of lever 8 rest in groove 15 of sleeve 5, allowing freedom of said sleeve for rotation. Sleeve 5 has longitudinal play over an inner sleeve 16; the sleeve 16 in turn has longitudinal play with respect to a spindle 17. The two sleeves preferably have rotational freedom with respect to one another as shown. The inner sleeve and spindle are prevented from relative rotation by rods 18 and 19 passing through spindle 17. Said rods move in longitudinal slots 20 and 21 in sleeve 16. Rod 18 and corresponding rod 22, the latter being fixed to sleeve 16, carry friction surfaces 23 and 24 adapted to engage plates 9 and 10 respectively. The spindle 17 is supported preferably by a cone bearing 25, said bearing being movable in a casing 26 against a spring 27 carried therein. Said spring may be adjusted by raising or lowering casing 26 by means of nut 28, suitably mounted on casing 1. Bearing 29 fixed to the casing at 29ª is provided near the upper end of sleeve 16 and arranged to allow longitudinal motion therethrough.

Preferably at the lower end, the spindle 17 and sleeve 16 are connected through a centrifugal device. Said centrifugal device is here represented by weights 30, each being pivotally connected by arms 31 and 32 with the ends to rod 19 and projections on the end of sleeve 16. All of said arms are pivotally connected to the weights 30. Suitable stops 33 and 34 are provided for respective outward motion and inward motion of the weights. Springs 38 are attached between the extended ends of arms 31 and 32. The upper end of spindle 17 carries the turntable 40, the base of said turntable being drilled to receive the head of spindle 17 and a slot 41 in said base is provided for pin 41ª passing through the spindle. The upper end of sleeve 16 is adapted to contact with the said base of the turntable and raise the latter with respect to the upper end of the spindle on which said base normally rests. The pin 41ª has vertical play in slot 41 but it fixes the turntable 40 and spindle 17 for rotation together. The turntable 40 is provided with an upper face adapted to receive a disk record with a hole at its center. An extension 42ª of the turntable is adapted to pass up through the hole in the record and engage a cap 42 (Fig. 13), which consists of a circular resilient plate the central portion of which is slightly raised. A sector 43 of said cap is cut away and a circular hole at its center is adapted to fit in a groove 43ª cut in the top of extension 42ª.

Above and below the record disk extend tone arms 44 and 45, respectively. These may be mounted on separate bases as in Fig. 15, or on the same concentric base with motion relatively to each other as in Fig. 13, or fixed to a common movable base, as in Fig. 1. The preferred type allows relative motion of the two tone arms, but I describe first the form having two tone arms fixed to one another and mounted on a single base, as it is the simplest form. Fig. 1 illustrates such a compound tone arm 44 and 45. The mounting of said tone arm consists of any of the usual accepted constructions, giving play to the tone arm over the whole disk. The two tone arms are united at 47 below which they preferably have a common sound passage 47ª to the exterior. The tone arm 45 extends from its junction 47 to a point underneath the disk having a similar position relative to the under side of the disk that the upper tone arm has to the upper side of the disk. Their ends above and beneath the disk are angularly displaced so that the distance between their styli is about equal to the distance from the outer grooves on the disk to the inner grooves directly across the central hole in said disk. In Fig. 5 is represented this angular disposition, the lower tone arm being in dotted lines. To each of said tone arms is fixed a sound box adapted for any of the desired forms of vibrations. I have illustrated tone arms as provided with laterally vibrating diaphragms 48 and the same connected to the tone arms by the goose neck extensions 49, horizontally pivoted at 50. Fixed to the under side of tone arms 44 and 45 at 52 are leaf springs 51 with adjusting screw 53 pressing against extensions 49 limiting the downward motion of sound boxes 48. The sound boxes are rotatably mounted in the end of the extensions, collars 54 being fixed to the sound boxes rotating in the extensions. A binding nut 55 is threaded into collar 54 and moves in slot 56 in extension 49, thereby allowing the stylus two positions as shown in the full and dotted lines of Fig. 9. A portion of the case underneath the record is removed as shown at 57 in Fig. 5 that the sound box on 45 may extend upward toward the record.

The lever 13 is doubly pivoted at right angles at 58 and 58$^a$ to the operating lever 8 and extends up through the casing at 59, terminating in a suitable knob or handle 60. Fixed to said arm is projection 61 which bears a beveled edge wheel 61$^a$ adapted to roll in notches 62 in a setting plate 63. Plate 63 is in the form of an arc with 58$^a$ as a center. Above projection 61 and adapted to rotate around the arm 13 is a rotatable collar 64. Extending from tone arm 44 is an arm 65 adapted to gradually engage collar 64, causing it to rotate around arm 13. The face of 65 is slightly inclined inward with respect to the axis of rotation of the tone arm. When arm 65 engages collar 64, it gradually forces lever 13 from the setting plate 63. The rolling system 64 and 61$^a$ and the direction of the force applied are adapted to make the back thrust on the tone arm a minimum. To aid in setting, an indicating arrow 66 is placed on arm 65 indicating the relative position of 64 and 65 that will just force 61$^a$ out of its notch. Preferably, setting plate 63 is slightly elevated on the side nearest the lever 13 in order to prevent 61$^a$ from rolling out of the notch except when acted on by 65.

In this form of the invention, operation is facilitated by the record having a designation number stamped thereon as indicated at 67. The number indicates how far the upper tone arm must move over the record before the lower tone arm is in position for the beginning of the record on the under face and the notch with the corresponding number is where the wheel 61$^a$ is to be placed.

To operate this form of the invention the extension 49 is elevated as shown in the dotted position of Fig. 9. The tone arm 44 is moved toward the operator facing the instrument as illustrated in Fig. 1, until the lower tone arm strikes the dash pot or a suitable stop. A record is placed on 40 with the face up that bears the number as indicated at 67. The cap 42 is slid into position over the record by pressing it down to engage 42 with 43$^a$. The arm 13 is grasped by the handle 60, raised and pushed forward, allowing wheel 61$^a$ to engage the notch in setting plate 63 that corresponds to the number placed on the record. The machine is started by turning nut 3 or other suitable starter.

Fig. 1 shows the position of the parts just as this rotation begins and Fig. 3 shows the relation of the two styli to the record and the direction of rotation, neither stylus being in contact with the record.

When rotation begins the weights 30 are forced out to the stops 33 by centrifugal force and the inner ends of arms 32 and 31 are thereby drawn closer together. Rod 17, bearing cross arms 18 and 19 cannot move downward on account of the contact of 23 with plate 9 in this position. The sleeve 16, however, is free to move upwardly through the action of the arms 31, with the result that outward motion of the weights produce motion of the sleeve 16 only. The sleeve moves upward raising the turntable 40 slightly from its seat on the head of spindle 17. Stops 33 limit the centrifugal action so that the record is elevated only enough to disengage the extension 49 from the stop 53.

The stylus being engaged in the spiral groove on the record gradually moves tone arm 44 toward the center. Near the desired limit of the motion of the tone arm 44, arm 65 (Fig. 6) engages collar 64. Further motion causes 64 to rotate and lever 13 to be pushed outward from setting plate 63. The collar 64 and wheel 61$^a$ reduce the friction while the direction of the resultant thrust on the tone arm is so directed as to produce a minimum of strain on the stylus. When arrow 65 is above the edge of wheel 61$^a$ the lever 13 is disengaged and lever 8 moves under tension of spring 12. Dash pot 14 regulates and limits the motion of lever 8. Just before reaching the limit of its downward motion, sleeve 5, through plate 10 engages friction surfaces 24 and forces sleeve 16 down against tension of springs 38. This causes the head of 16 to lower from the bottom of 40.

The sleeve 16 spindle 17 and turntable 40 resting on top of said spindle, are now supported by spring 27 through bearing 25.

Sleeve 16 is held down and the force operates to depress rod 19 and spindle 17 against the tension of spring 27. In the first case the centrifugal action operated against the weight of sleeve 16 and turntable 40, in the second case the same force operates against spring 27, the force of which may be adjusted to have any desired relation to the said weight. The downward motion of the turntable is limited by the head of sleeve 16.

The relative positions of the styli and record are illustrated in Figs. 3 and 4 wherein the arrows above and below the plate show the direction of motion of the forward and rear edges of the plate respectively. The dotted lines represent the position of the plate while centrifugal action is operating. Thus the stylus in tracking, carries tone arm 44 from the outer edge of the upper surface to the limit of the record and in so doing moves the lower tone arm 45 from the inner edge of the under record to its outer edge. If the under record is not longer than the record on the upper surface, on completion of the upper record, the machine is immediately positioned for playing the lower record. If longer, a number of unrecorded turns have to be executed before the change, in order to get the full record space for the lower record. The setting number on the upper record indicates how far the stylus must go before the lever is tripped. In the second position the record rotates in a reverse direction and the undertone arm tracks toward the center where a suitable automatic stop may operate to stop the phonograph. Or the mechanism may be arranged to automatically repeat its operation by a cam device such as shown in my application for patent filed May 6, 1915, Serial Number 26,335.

If desired this machine can be made to play two especially designed records simultaneously. A record should be made with grooves on both faces recorded in the same direction but being in the form of an opening spiral on one face and a closing spiral on the other. The closing spiral face is placed down and the lever 13 is lowered to the second position and the upper sound box rotated to give the dotted position of the stylus in Fig. 9. The upper arm is moved to the center, the machine started and spring 53 withdrawn from under extension 49.

In Fig. 13 is illustrated the preferred form of this invention wherein all parts correspond to the above description of Fig. 1 and Fig. 2 except the tone arms. The tone arm 44 is mounted in the usual manner on a base 70. Mounted on a base 71 concentric with base 70 is a sleeve 72. Tone arm 45 extends underneath the record and bends downward to and opens into sleeve 72, to which it is rigidly fixed. A portion 73 of the tone arm 44 is cut away so that in all relative positions the two tone arms may take the opening of 45 into 44 is uncovered. Normally the two tone arm systems move independently of each other. Binding nut 75, threaded into 44, moving in a slot 75ª, makes it possible to fix the tone arms together at the angle shown in Fig. 1. When so fixed the operations will be the same as given above for Fig. 1. The arm 76 is a counterpart of 65 and its action on arm 13 is the same only from the other side. The upper part of arm 13 is pivoted at 77 allowing it to be bent forward to the dotted position so that tone arm 44 may pass over it when desired. Affixed to arm 13 is a projection 78 bearing a wheel 79, shown in Fig. 14ª, which engages the weighted end of lever 80, attached preferably to the under surface of the casing at 81. The other end of lever 80 carries an arm 82 pivoted at 83, having extension 84 which prevents its motion downward with respect to the lever 80. An arm 85 fixed to tone arm 45 extends upward and is adapted to elevate lever 82 in its motion out from arm 13. After passing outward beyond the end of 82, tone arm 45 is prevented from motion inward except when arm 13 is down. 86 is a cutaway portion of the case, permitting the stylus of the lower sound box to project up toward the record.

The operation of the preferred form of this invention is as described for Fig. 1 with regard to the motion of the record rotating elements. To place the record, both tone arms are pushed to the side away from the operator facing the machine as illustrated. In this position the tone arm 44 has cleared the position occupied by the record. The record is placed on the turntable 40 and bound by cap 42. The arm 13 is raised and positioned in the notch indicated on the record or, by moving the tone arm 44 to the inner end of the record and noting the number on the scale on 63 that arrow 66 points to, and setting arm 13 at that point. Tone arm 44 is held over the plate at the starting point of the upper record and the machine started. The record will rise to engage the upper stylus, which in turn will draw the tone arm in toward the center as the record is played. When the arm 13 is tripped by arm 76, the tone arm 45, which has been held against lever 82 and in position at the starting point of the under record, is freed. The record rotating in reversed direction is engaged by the stylus. The lower tone arm tracks forward toward the center where it may be stopped by a suitable automatic stop.

I have illustrated the direction of motion of the record as clockwise and the tone arms as acting on the rear side of the record.

Evidently the direction of the record in any case may be reversed by changing the angle of both styli, as illustrated in Fig. 9. Or the side of the record on which the tone arms operate may be changed by changing the said angle of both styli and pulling the tone arms to the near edge of the disk for starting. An arm corresponding to 76 must then be placed on the far side of the tone arm.

This machine can be made to play two sides of a record simultaneously, both sides of which have been recorded with a closing spiral in the same direction. The operation would be to start with both arms at the edge of the plate, with lever 13 down, spring 51 drawn aside and the upper stylus turned to the other position from what it is for successive reproduction.

In Fig. 15 I have illustrated a modification of the invention wherein friction operates to produce a displacement of the record parallel to its axis. I have illustrated the tone arms as entirely separate, which construction might also be used in the last described form of the invention.

The spindle $17^a$ has rigidly mounted thereon friction plates 93 and 94. These are connected with the gear sleeve $5^a$ by means of oppositely coiled springs 95 and 96, respectively. The sleeve $5^a$ is of the construction of Fig. 1, except that at its center a slot 90 is provided. A pin 91 passing through spindle $17^a$ moves in said slot, the slot being of the shape shown in Fig. 16, allowing the pin 91 to turn through an angle of some 75 degrees. Further the slot 91 is inclined upward in the direction of rotation of the spindle when in its lower position as shown here. Two suitable friction members $96^a$ and $97^a$ are provided, being mounted on levers 96 and 97 pivoted at 98 and 100, respectively, and provided with stops 103. Springs 102 adjusted by screws 101, add pressure to the friction surfaces when in contact. Suitable bearings 89 support the spindle and allow it longitudinal play.

Tone arms 44 and 45 are mounted on bases 105 and 106 respectively, any of the accepted forms of mounting being used. These bases are illustrated as being oppositely disposed with respect to the record, though they may have any suitable relative position around the rotating member. The sound boxes and styli are as described before and the incline of the styli as illustrated.

The method of placing the record is as before outlined. The tone arms are pulled to the forward edge of the disk where suitable stops may be provided. The lever $13^a$ is raised and set as described above. In this position the record is slightly below the stylus of tone arm 44, and friction surfaces 93 and $96^a$ are in contact. On starting the rotation in clockwise direction friction between these surfaces 93 and $96^a$ will tend to hold spindle $17^a$ back from following sleeve $5^a$. This lag of $17^a$ will cause pin 91 to rise in slot 90, thereby raising the spindle and bringing the record into engagement with the stylus of tone arm 44. When the arm $13^a$ is tripped in the manner before described the positions of the parts are as shown in the illustration. The record is slightly above the stylus and the direction of rotation is reversed. Friction between surfaces 94 and $97^a$ tend to make the spindle $17^a$ lag behind sleeve $5^a$. Through the action of pin 91 this lag produces a depression of the spindle and moves the record to contact with the stylus of tone arm 45.

From the above it will be seen that the operation as described involves a particular method of producing contact between the record and stylus and that the device illustrated is adapted to automatically reproduce in succession the sound records placed on the opposite faces of a disk, said records being dissimilar.

It is obvious that numerous changes may be made in the details of the operation and structure without departure from the essentials of the invention, and the parts may be taken without its adoption in entirety.

Having described my invention, what I claim as new and desire to secure by Letters Patent is:

1. The combination with a sound reproducing mechanism having a stylus and a record, of means controlled by the speed of said record for maintaining contact between said record and stylus.

2. The combination with a sound reproducing mechanism having stylus means and a record, of a centrifugal control operating to produce contact between said record and stylus means.

3. In a phonograph, a sound box, a stylus, a record adapted for engagement with said stylus, means for rotating said record, and means operated by centrifugal force generated by rotation of said record for automatically effecting engagement between said record and stylus when said rotation has attained a desired speed.

4. In a phonograph, a sound box, a stylus, a record adapted for engagement with said stylus, means for rotating said record, and means for automatically disengaging said stylus and record when said rotation falls below the desired speed.

5. In a phonograph, a sound box, a stylus, a record, means for rotating said record, and means operated by centrifugal force generated by rotation of said record for automatically maintaining engagement between said record and said stylus during the continuance of said rotation above a desired speed.

6. In a phonograph, a record body provided with a sound record, part being recorded in one direction of rotation of the record body, the other part being recorded in the reversed direction of rotation of the record body, means for rotating said record in either direction, stylus means, and means for causing said stylus means to follow said record in the respective directions in which said record was recorded.

7. An improvement in phonographs comprising a record body provided with records extending in opposite directions of rotation about an axis in said body, means for rotating the record body in either direction, and means for successively reproducing the respective records.

8. In a phonograph, a record, means for moving said record, a plurality of tone arms mounted separately and adapted to move across said record independently, and locking means causing said arms to move together.

9. An improvement in phonographs comprising a record body provided with a plurality of record grooves, means for rotating said body, a plurality of tone arms each provided with a sound box and a stylus, means for bringing one record into engagement with a stylus when the other stylus has completed its traverse of the other groove, said tone arms being connected to cause one sound box to travel away from the center of the record body as the other sound box travels toward said center.

10. In a phonograph, a record, means for rotating said record, a plurality of tone arms adapted to move across said record, and means for locking one of said tone arms against movement until the other tone arm has moved across said record.

11. In a phonograph, a record, means for rotating said record, tone arms above and below said record, said tone arms being positioned to move across said record, and means for locking one of said tone arms until the other of said tone arms has moved across said record.

12. In a phonograph, a record, a tone arm bearing a sound box, a stylus associated with said sound box and adapted to engage said record, means for moving said record, means for causing said stylus and record to become engaged, setting means for timing the action of said engaging means, and means whereby a portion of the energy for operating said engaging means is stored in the positioning of said setting means.

13. In a phonograph, a record, a tone arm bearing a sound box, a stylus associated with said sound box and adapted to engage said record, means for moving said record, means for changing the relation of said record and said stylus, setting means for timing the said change, and means associated with said setting means whereby a portion of the energy for effecting said change is stored in the positioning of said setting means.

14. In a phonograph, a record, a tone arm bearing a sound box, a stylus associated with said sound box, and adapted to engage said record, means for moving the record, means for varying the distance between said record and said stylus, and a lever for controlling said distance-varying means, said lever having a portion capable of being positioned in the path of movement of said tone arm, whereby contact between said tone arm and said lever causes said distance-varying means to operate.

15. In a phonograph, a record, means for moving a record, a tone arm bearing a sound box, a stylus associated with said sound box and adapted to engage said record, means for changing the relation of said record and said stylus, a lever, means operated by said lever to store up energy for said changing means, said lever having a portion capable of being positioned in the path of movement of said tone arm, whereby said energy for operating said changing means is released.

16. In a phonograph, a record support, means for rotating said record support, a stylus adapted to contact with a record carried by said record support, and centrifugal means for producing said contact.

17. In a phonograph, a record support, means for rotating said record support, a stylus adapted to contact with a record carried by said record support, and centrifugal means associated with the rotation of said record support for producing said contact.

18. In a phonograph, a rotatable record support, means for bringing said record support to a desired speed of rotation, and means for displacing said record support when said speed is attained.

19. In a phonograph, a record support, a rotatable device on which said support is mounted, means for rotating said device, and means for displacing portions of said device from their normal positions to move the record support in a plurality of directions.

20. In a phonograph, a record support, a rotatable device on which said support is mounted, means for rotating said device, and means acting automatically for displacing portions of said device from their positions to move the record support in a plurality of directions.

21. In a phonograph, a record support, a rotatable device on which said support is mounted, means for rotating said device, and means for alternately displacing said device lengthwise in each direction from its normal position.

22. In a phonograph, a record support, a rotatable spindle on which said support is mounted, a centrifugal member mounted on said spindle, and means for rotating said spindle.

23. In a phonograph, a record support, a rotatable spindle on which said support is mounted, centrifugal means operating to displace said spindle, and means for rotating said spindle.

24. In a phonograph, a rotatable device, a record support mounted thereon, and centrifugal means for displacing said device lengthwise in either direction from its normal position.

25. In a phonograph, a record, means for moving said record, a plurality of tone arms adapted to move across said record, sound boxes attached to said tone arms, and means for connecting said tone arms to cause them to move in succession across said record toward the center thereof.

26. In a phonograph, a record, means for rotating said record, a tone arm provided with a sound box carrying a stylus, a lever, means controlled by said lever for varying the relative position of said record and said stylus, and means whereby said tone arm may actuate said lever to operate said varying means.

27. In a phonograph, a record, means for rotating said record, a tone arm provided with a sound box carrying a stylus, a lever positioned against a force tending to restore it, means controlled by said lever for varying the relative position of said record and stylus, means for holding said lever in a predetermined position, and means associated with said motion of said tone arm for moving said lever from said position, causing said lever to operate said varying means.

28. In a phonograph, a plurality of movable tone arms provided with means for supporting styli adapted to be engaged in different sound grooves of a record, and means controlled by the movement of the tone arms for automatically moving said record to engage said styli alternately.

29. In a phonograph, a plurality of movable arms provided with means for supporting styli, means for rotating a record between said styli, and means controlled by the movement of the tone arms for automatically moving said record to contact alternately with said styli.

30. In a phonograph, a plurality of styli adapted to vibrate and be propelled across the face of a record, means for rotating a record between said styli, and means operated by the record rotating means for causing said record to move into contact with said styli alternately.

31. In a phonograph, a plurality of styli, a record having sound record grooves on two opposite faces, means for rotating said record between said styli, and means for moving said record to contact alternately with said styli.

32. In a phonograph, a plurality of styli, a record having sound record grooves on opposite faces, means for rotating said record between said styli, and means operated by the machine for automatically moving said record to contact alternately with said styli.

33. In a phonograph, a plurality of styli, means for rotating a record between said styli, means for moving said record to contact with one stylus, and means for positioning the other stylus where it may contact with said record.

34. In a phonograph, a plurality of styli adapted to engage a record, means for moving said record to engage one stylus, and means for positioning the other of said styli where it may engage said record.

35. In a phonograph, a plurality of styli adapted to engage a record, means acting automatically for moving said record to engage one stylus, and means for moving the other stylus where it may engage said record.

36. In a machine of the class set forth, a rotatable record disk having record grooves in its opposite faces, said grooves running in opposite directions, means for imparting forward and reverse rotation to said disk, and automatic means for successively reproducing sounds from said grooves.

37. In a machine of the class set forth, a rotatable support, a record disk mounted on said support and having dissimilar sound records upon its opposite faces, automatic means for successively reproducing sounds from said records without disengaging the disk from its support, the lines of the said dissimilar sound records running in opposite directions, and means for rotating said support in either direction.

38. In a phonograph, a record mounted on a rotatable member, means for bringing said member to a desired speed of rotation, and means acting automatically for displacing said member when said speed is attained.

39. In a phonograph, a disk record mounted on a rotatable member, means for rotating said member, and centrifugal means controlled by rotation of said member and acting automatically for moving the plane of rotation of said disk.

40. In a machine of the class set forth, a rotatable support, a disk mounted on said support and having sound records therein recorded in opposite directions, means acting automatically to reproduce successively the sounds recorded in one direction and then all the sounds recorded in the opposite direction and means for rotating said support in either direction.

41. In a phonograph, a rotatable record disk having spirally arranged record grooves in its opposite faces, the grooves in the respective faces extending in opposite directions, a rotatable support for said record, means for rotating said disk in either direction and means whereby rotation of said disk may be reversed to produce said records in succession.

And I do hereby declare the above to be a full, clear, and exact description of the invention, such as will enable others skilled in the art to which it appertains, to make and use the same.

Signed at Raleigh, in the county of Wake, and State of North Carolina, this 19th day of May, 1915.

CHARLES M. HECK.

In the presence of—
A. T. SHAW,
J. P. GONNAFFOKI.